United States Patent [19]

Marsi

[11] Patent Number: 5,562,294

[45] Date of Patent: Oct. 8, 1996

[54] BACKUP SEAL FOR AXIAL FACE SEAL

[75] Inventor: Joseph A. Marsi, Rolling Hills Estates, Calif.

[73] Assignee: BW/IP International, Inc., Long Beach, Calif.

[21] Appl. No.: 197,235

[22] Filed: Jan. 28, 1994

[51] Int. Cl.⁶ .................................................. F16J 15/34
[52] U.S. Cl. ........................... 277/27; 277/65; 277/170; 277/174; 277/190; 277/DIG. 10
[58] Field of Search .......................... 277/27, 65, 81 R, 277/94, 115, 117, 119, 120, 122, 144, 170, 174, 190, 193, 222, DIG. 10

[56] References Cited

U.S. PATENT DOCUMENTS

| | | |
|---|---|---|
| 2,080,579 | 5/1937 | Schaub . |
| 2,489,191 | 11/1949 | Looke .................... 277/115 X |
| 2,518,980 | 8/1950 | Early ..................... 277/115 X |
| 2,756,017 | 7/1956 | Silverman ............. 277/115 X |
| 3,096,985 | 7/1963 | Biheller ................. 277/27 X |
| 3,606,356 | 9/1971 | Beroset ................. 277/190 X |
| 3,810,639 | 5/1974 | Scannell ............ 277/DIG. 10 X |
| 3,947,044 | 3/1976 | Friedrich . |
| 4,094,512 | 6/1978 | Back . |
| 4,375,291 | 3/1983 | Padgett . |
| 4,475,739 | 10/1984 | Nakajima . |
| 5,071,139 | 12/1991 | Warner .................. 277/27 |
| 5,292,138 | 3/1994 | Glynn et al. . |

FOREIGN PATENT DOCUMENTS

| | | | |
|---|---|---|---|
| 941763 | 7/1982 | U.S.S.R. ................ 277/27 |
| 2247724 | 3/1992 | United Kingdom ...... 277/27 |

OTHER PUBLICATIONS

H. Hugo Buchter; "Industrial Sealing Technology";pp. 285–95 Jul. 1986.

"Seals and Sealing Handbook";pp. 190–196 Jul. 1986.

Primary Examiner—Scott Cummings
Attorney, Agent, or Firm—Pretty, Schroeder, Brueggemann & Clark

[57] ABSTRACT

A fluid handling machine having a shaft, a radially disposed housing, and a backup seal. During normal operation, the backup seal is concentric with and radially spaced from the shaft. The backup seal includes a first annular portion located adjacent the backup seal chamber and a second annular portion preferably made of carbon graphite. The backup seal is configured to engage the housing such that when the fluid pressure in the backup seal chamber exceeds a predetermined level, a sufficient axial force is applied to the first annular portion and transmitted therethrough to the second annular portion to cause the second annular portion to close radially into sealing engagement with the shaft.

10 Claims, 2 Drawing Sheets

BACKUP SEAL FOR AXIAL FACE SEAL

BACKGROUND OF THE INVENTION

This invention relates generally to backup seals and, in particular, to a passive backup seal for fluid sealing between a shaft and a radially disposed housing through which the shaft extends, the backup seal being inactive during normal operation, but coming into sealing engagement with the shaft after a failure of a main seal or seals associated with the shaft.

Fluid handling machines, such as pumps or hydraulic piston devices, often include a rotating or reciprocating shaft mounted within a housing. To reduce leakage of pressurized fluid through the space between the housing and the shaft, a seal or a plurality of seals may be used. Conventional seals used for such applications include lapped face mechanical seals, labyrinth seals, packed glands, O-rings, and other similar well-known devices.

In high pressure and/or high temperature applications or where the fluid being handled is toxic or otherwise contaminated, a backup seal is often employed to contain the handled fluid should the main seal or seals fail. For example, in a high pressure pump incorporating a plurality of mechanical seals to break down the pressure from the inside of the pump to the atmosphere, an additional mechanical seal may be used to serve as a backup should one or more of the other seals fail. This additional mechanical seal, however, has certain disadvantages. In particular, the additional mechanical seal requires lubrication and is subject to wear during normal operation of the machine. Alternatively, an actuated closure mechanism may be used wherein a sensor is employed to detect whether a failure condition has occurred, and, upon detection, the sealing mechanism is actuated. In this instance, the sealing mechanism is not used during normal operation of the machine, but is actuated only after a failure. Such a system, however, requires added instrumentation to detect the failure mode and to actuate the sealing mechanism, and, itself, may fail.

A passive device presently used as a backup seal is a segmented, carbon graphite ring disposed around the shaft. The ring is mounted so as to have a relatively close clearance with respect to the shaft. Upon failure of the main seal, the pressurized fluid applies a radial force against the radially outer diameter of the ring. Because carbon graphite has a relatively low modulus of elasticity, it will deform and shrink upon application of a sufficient radial force to close upon the shaft. While the carbon graphite ring described above functions generally satisfactorily, it nevertheless has its own disadvantages. In particular, due to the relatively close clearance that must be maintained between the ring and the shaft to insure proper functioning upon failure of the main seal, the ring tends to wear against the shaft during normal operation of the machine and may, therefore, not seal completely when actuated because of the wear.

It should therefore be appreciated that there is still a need for a backup seal that is completely passive during normal operation of the fluid handling device, but which will immediately and effectively seal the shaft upon failure of the main seal system. The present invention satisfies this need.

SUMMARY OF THE INVENTION

The present invention is embodied in a backup or standby seal for a fluid handling machine which is actuated by the pressure to which the seal is exposed if the main (mechanical or other) seal fails, but which is totally passive during normal operation of the machine. The invention may be used with a fluid handling machine having a rotating or reciprocating shaft mounted within a housing.

The backup seal of the present invention includes an annular closure concentric with and radially spaced from the shaft during normal operation of the machine. The closure includes a first portion and a second portion, both of which have an annular shape and are axially disposed relative to each other. The first portion is configured to transmit an axially directed force arising from the release of pressurized fluid during a main seal failure to the second portion. The annular closure is configured to be and is made of a material that is responsive to a predetermined axial force applied to the first portion, causing the second portion to close radially into sealing engagement the shaft.

A feature of the present invention is that the second portion of the closure member may be provided with a conical surface that is disposed in cooperative engagement with a corresponding conically shaped portion of the housing. Additionally, the second portion may be made of carbon graphite. An O-ring may be placed between the first portion and the housing to hold the closure in place. When the machine is in normal operation, there is no pressure on the closure member and it clears the rotating (or reciprocating) shaft with a safe clearance.

Another feature of the invention is that the closure may be provided with two radial grooves which leave a very small cross-section between them, separating the first portion from the second portion of the closure member. When the main seal fails and the closure is exposed to pressure, it will break at the small cross-section and the second portion will be forced against the housing and deflect radially inward until it closes around the shaft. The pressure at which this happens may be predetermined by the design geometry and the mechanical properties of the closure material. Carbon graphite is a preferred material because of its low elastic modulus, so it deflects readily.

Another feature of the invention is that axial cuts may be provided in the second portion to insure that the second portion closes around the shaft at a very low pressure. For example, the first portion and the second portion of the closure may be made from separate pieces with the second portion being a split ring or a two-piece stepped ring.

Other features and advantages of the present invention will become apparent from the following description of the preferred embodiments, taken in conjunction with the accompanying drawings, which illustrate, by way of example, the principles of the invention.

BRIEF DESCRIPTION OF TEE DRAWINGS

DETAILED DESCRIPTION OF THE PREFERRED EMBODIMENTS

Figure 1:
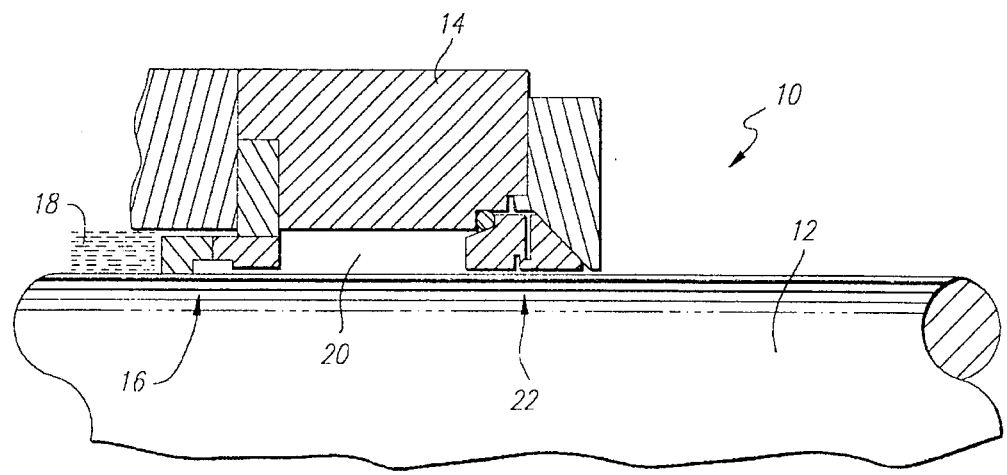
FIG. 1 is a cross-sectional schematic view of a fluid handling machine having a main seal and a backup seal according to the present invention.

A fluid handling machine 10 having a cylindrical shaft 12 and a housing 14 is shown in FIG. 1. In this case, the shaft is rotatably mounted within the housing and a lapped face mechanical seal assembly (shown schematically at 16) is used to seal a fluid medium 18, substantially preventing the fluid from moving along the shaft into a backup seal chamber 20. The mechanical seal assembly 16 acts as the primary or main seal during normal operation of the machine. A backup seal 22 is mounted to the housing adjacent the backup seal chamber where it will be exposed to pressurized fluid if the main seal 16 fails.

Although a rotating shaft and mechanical seal are shown in FIG. 1, the present invention may also be used with reciprocating shafts and other types of primary seals, such as labyrinth seals, packing glands and simple O-rings. Additionally, the machine may include a primary sealing system wherein multiple seals or a combination of different types of seals are used.

Figure 2:
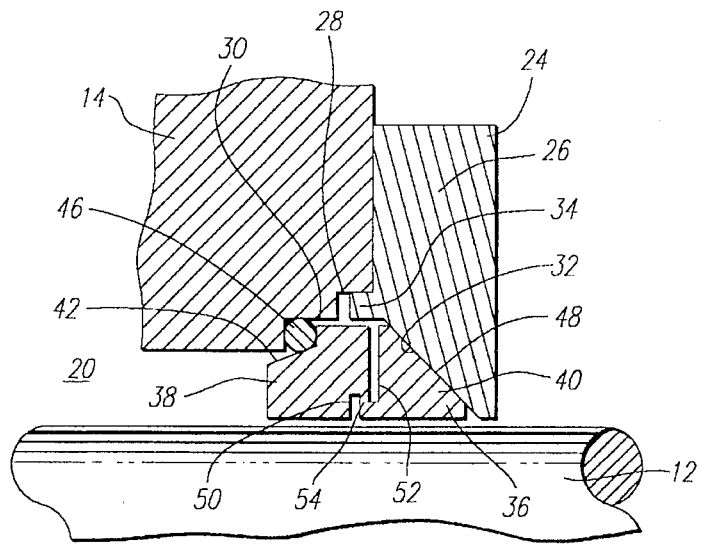
FIG. 2 is a sectional view of a backup seal for a fluid handling machine according to the present invention, showing the position of a closure for the backup seal during normal operation of the machine.
Figure 3:
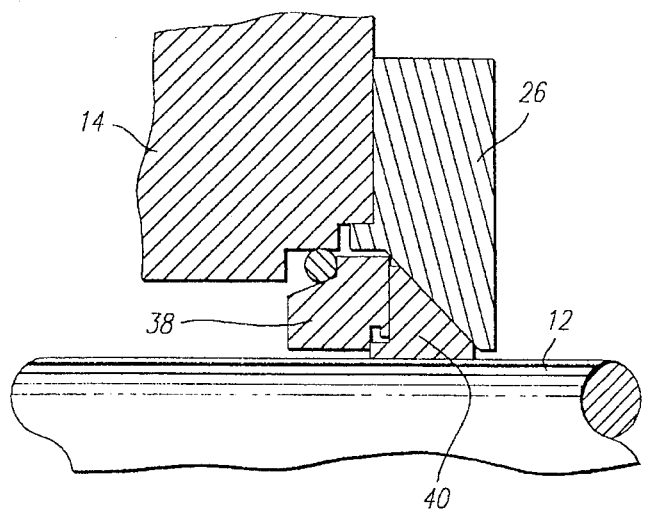
FIG. 3 is a sectional view of the backup seal of FIG. 2, showing the position of the closure after failure of the main sealing system of the machine.

With reference now to FIGS. 2 and 3, the housing 14 includes a removable flange 26, which may be mounted to the remainder of the housing by fasteners (not shown). The inner surface of the housing includes a first stepped portion 28 and a second stepped portion 30. The flange 26 includes an interior conical surface 32 and an annular ridge 34 projecting axially from the conical surface. The annular ridge engages the first stepped portion 28 to form a secure connection to the remainder of the housing.

The backup seal 22 includes an annular closure 36 having a generally trapezoidal cross-section during normal operation of the machine. The inner diameter of the closure is greater than the outer diameter of the shaft to prevent any contact or engagement during normal operation. In the preferred embodiment, the closure is a unitary piece made of carbon graphite. Carbon graphite is preferred because of its low elastic modulus. Carbon graphite is also suitable for use at high temperatures and is self-lubricating.

The closure 36 includes a first portion 38 and a second portion 40, both of which are annular and are axially disposed relative to one another with the first portion located closer to the main seal than the second portion. The first portion 38 includes a first surface 42 used to locate an O-ring 46 between the closure and the second stepped portion 30 of the housing. The second portion 40 has an outer conical surface 48 that cooperates with the interior conical surface 32 of the flange 26. The cross-section of the closure is preferably sized such that during normal operation, the O-ring 46 biases the conical surface of the second portion into contacting relation with the conical surface of the flange. The O-ring also effectively forms a seal between the closure and the housing.

The preferred mechanism for facilitating movement of the second portion 40 into sealing engagement with the shaft after a main seal failure, is a first radial groove 50 circumferentially disposed around the inside surface of the closure and a second radial groove 52 circumferentially disposed around the outside surface of the closure. The first and second radial grooves are axially spaced from each other with the first radial groove 50 located closer to the main seal than the second radial groove 52. The depth of each groove is sufficient to form an axially disposed connecting piece 54 between the grooves. In particular, the radially outer portion of the first groove 50 is located at a greater distance from the shaft than, and is axially spaced from, the radially inner portion of the second groove 52.

The shape of the cross-section of the connecting piece 54 is chosen such that when the main seal fails and the backup seal chamber 20 is pressurized to a predetermined level, the connecting piece will break. In particular, failure of the main seal will create a leakage of fluid into the backup seal chamber 20 (FIG. 3). Once the fluid pressure builds up to the predetermined level, the force transmitted by the first portion 38 to the second portion 40 will shear or otherwise break the connecting piece 54, permitting the second portion to move relative to the first portion. The axial force acting on the first portion will force the conical surface 48 of the second portion against the conical surface 32 of the flange 26, causing the second portion to deflect radially inwardly and axially away from the main seal until it closes around and seals the shaft. A carbon graphite material is particularly suitable for this function because it readily deflects due to its low modulus of elasticity. The carbon graphite also lubricates the contacting conical surfaces, facilitating movement of the second portion when it is actuated.

It should be appreciated that the orientation, placement and depth of the grooves 50, 52 of the closure may be varied to cause breaking of the connecting piece at various predetermined fluid pressures existing within the backup seal chamber. Additionally, the configuration of the closure, the location of the O-ring, the angle of the conical surfaces and the radial clearance between the shaft and the closure may also be varied as desired to achieve the required result.

Figure 4:
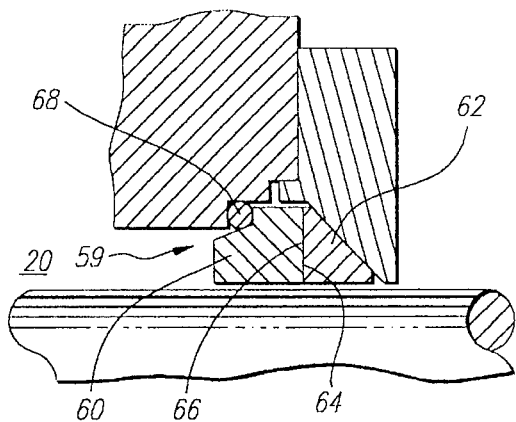
FIG. 4 is a sectional view of an alternative embodiment of the backup seal of the present invention, showing the position of the closure during normal operation of the machine.
Figure 5:
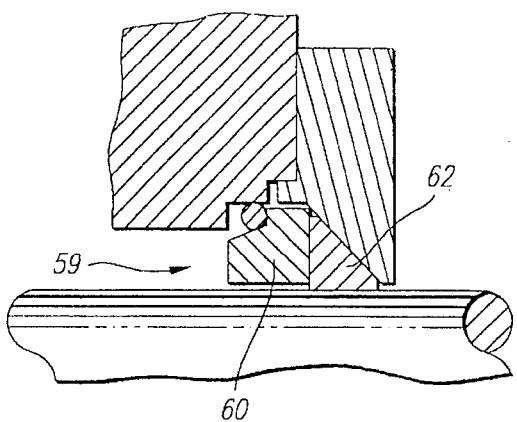
FIG. 5 is a sectional view of the backup seal of FIG. 4, showing the position of the closure after failure of the main sealing system of the machine.

With reference now to FIGS. 4 and 5, a closure 59 may be made from two distinct pieces, instead of a single unitary piece. Like the closure in FIGS. 2 and 3, the closure 59 includes a first portion 60 and a second portion 62, both of which are annular and are axially disposed relative to one another with the first portion located closer to the main seal than the second portion. In this case, however, the first portion 60 is preferably made of steel, and the second portion 62 made of carbon graphite. Additionally, the first portion 60 preferably has a radially disposed surface 64 that is biased directly against a corresponding radially disposed surface 66 of the second portion by the O-ring 68. Operation of the closure shown in FIGS. 4 and 5 is identical to the operation of the closure shown in FIGS. 2 and 3, except the closure does not need to overcome the shear force of the connecting piece before being actuated. Accordingly, the closure shown in FIGS. 4–5 is preferred when there is a requirement that the backup seal become actuated when a relatively low fluid pressure exists within the backup seal chamber 20.

Figure 6:
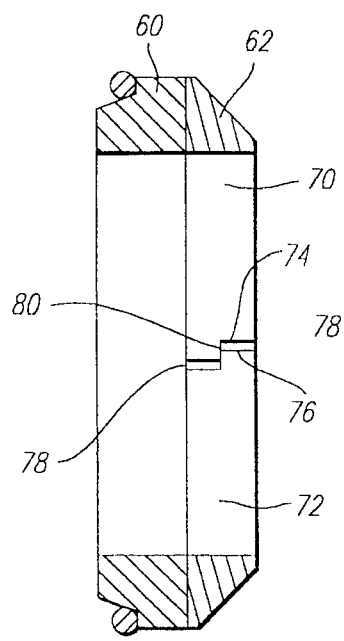
FIG. 6 is a sectional view of the closure shown in FIG. 4.
Figure 7:
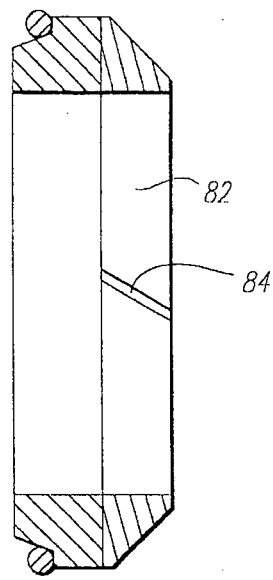
FIG. 7 is a sectional view of an alternative closure for use with the backup seal shown in FIG. 4.

If it is desired to even further reduce the level of fluid pressure at which the closure is actuated, the second portion 62 of the closure, which is ring shaped, may be made of two semi-circular halves 70, 72, as shown in FIG. 6. By using two spaced-apart halves, the force necessary to cause the second portion 62 to close around the shaft is reduced. In the embodiment shown, each half 70, 72 has a stepped portion 74, 76, respectively, at each end. Preferably, during normal operation, the stepped portions of the two halves are engaged along a radial plane as shown at 80, but are otherwise slightly spaced as shown by the gaps at 78. The engagement (at 80) reduces leakage that would otherwise occur after the ring has been closed on the shaft. To insure that the second portion closes fully on the shaft, the gap 78 between the halves 70, 72 should be made equal to or greater than the width of the gap between the closure and the shaft, i.e., the radial distance traversed by the second portion to seal the shaft upon failure of the main seal.

Alternatively, a one-piece split ring 82 as shown in FIG. 6, may be used to reduce the force necessary to cause the second portion to close around the shaft. In this case, the ring is split diagonally as shown by the gap at 84. To minimize leakage of the ring after it has closed on the shaft, the width and angle of the gap 84 are preferably chosen to correspond to the gap between the closure and the shaft. Of course, the second portion may be split in other ways and still achieve the same or similar desired results.

It should be appreciated from the foregoing description that the present invention provides an improved backup seal that is inactive during normal operation, but which is quickly and effectively actuated by the pressure to which it is exposed if the main seal fails. Depending on the application and the pressure at which the actuation of the backup seal is desired, the closure member may be made of a one piece or two piece construction, and, in the case of a two piece construction, the second portion of the closure may be further split into two or more pieces.

Although the invention has been described in detail with reference only to the preferred embodiments, those having ordinary skill in the art will appreciate that various modifications can be made without departing from the invention. Accordingly, the invention is defined with reference to the following claims.

I claim:

1. A backup seal for a fluid handling machine having a shaft, a radially disposed housing through which the shaft extends, and a backup seal chamber between the shaft and the housing, the backup seal, comprising:

an annular closure concentric with and radially spaced from the shaft when the fluid pressure in the backup seal chamber is below a predetermined level, the closure having a first annular portion, a second annular portion and a connecting piece between and integral with the first and second annular portions, the first annular portion located adjacent the backup seal chamber;

wherein the second annular portion of the closure is made of a material having a sufficient elastic modulus to permit its radial deflection;

wherein the closure is configured to engage the housing such that when the fluid pressure in the backup seal chamber exceeds the predetermined level, a sufficient axial force is applied to the first annular portion and transmitted therethrough to the second annular portion to cause the second annular portion to close radially into sealing engagement with the shaft; and wherein the connecting piece is configured to break when the pressure in the backup seal chamber exceeds the predetermined level, allowing the second annular portion to close radially into sealing engagement with the shaft.

2. The backup seal of claim 1, wherein the second annular portion has a conical surface to facilitate movement of the second annular portion into sealing engagement with the shaft when said sufficient axial force is applied to the first annular portion.

3. The backup seal of claim 2, wherein the second annular portion is made of carbon graphite.

4. The backup seal of claim 1, wherein the annular closure has an inner surface facing the shaft and an outer surface facing away from the shaft, and wherein the annular closure defines a first groove disposed circumferentially around its inner surface and a second groove disposed circumferentially around its outer surface, the grooves being axially spaced to form the connecting piece therebetween.

5. A fluid handling machine, comprising:

a housing;

a shaft in said housing and surrounded by said housing;

a primary seal operably mounted between said shaft and housing;

a backup seal operably mounted between said shaft and housing; and a backup seal chamber disposed between the primary seal and the backup seal;

wherein said backup seal includes an annular closure concentric with and radially spaced from the shaft when the fluid pressure in the backup seal chamber is below a predetermined level, the closure having a first annular portion, a second annular portion and a connecting piece between and integral with the first and second annular portions, the first annular portion located adjacent the backup seal chamber;

wherein the second annular portion of the closure is made of a material having a sufficient elastic modulus to permit its radial deflection;

wherein the closure is configured to engage the housing such that when the fluid pressure in the backup seal chamber exceeds the predetermined level, a sufficient axial force is applied to the first annular portion and transmitted therethrough to the second annular portion to cause the second annular portion to close radially into sealing engagement with the shaft; and wherein the connecting piece is configured to break when the pressure in the backup seal chamber exceeds the predetermined level, allowing the second annular portion to close radially into sealing engagement with the shaft.

6. The fluid handling machine of claim 5, wherein the second annular portion has a conical surface to facilitate movement of the second annular portion into sealing engagement with the shaft when said sufficient axial force is applied to the first annular portion.

7. The fluid handling machine of claim 6, wherein the housing includes a flange which defines an inner conical surface in contacting relation with the conical surface of the second annular portion, such that when the fluid pressure in the backup chamber exceeds the predetermined level, the conical surface of the second annular portion will slide with respect to the conical surface of the flange thereby moving into sealing engagement with the shaft.

8. The fluid handling machine of claim 7, wherein the second annular portion is made of carbon graphite.

9. The fluid handling machine of claim 6, further comprising an O-ring between the first annular portion and the housing for urging the second annular portion into engagement with the housing.

10. The fluid handling machine of claim 9, wherein the annular closure has an inner surface facing the shaft and an outer surface facing away from the shaft, and wherein the annular closure defines a first groove disposed circumferentially around its inner surface and a second groove disposed circumferentially around its outer surface, the grooves being axially spaced to form the connecting piece therebetween.

\* \* \* \* \*